United States Patent [19]

Mezger et al.

[11] Patent Number: 5,531,100

[45] Date of Patent: Jul. 2, 1996

[54] METHOD OF DETECTING A LEAKY EXHAUST VALVE

[75] Inventors: Manfred Mezger, Markgröningen; Klaus Ries-Müller, Bad Rappenau, both of Germany

[73] Assignee: Robert Bosch GmbH, Stuttgart, Germany

[21] Appl. No.: 404,564

[22] Filed: Mar. 15, 1995

[30] Foreign Application Priority Data

Jun. 10, 1994 [DE] Germany .......................... 44 20 290.3

[51] Int. Cl.[6] ................................................ G01M 15/00
[52] U.S. Cl. .................................. 73/47; 73/49.7; 73/115; 73/117.2
[58] Field of Search ............................ 73/47, 49.7, 115, 73/116, 117.2, 117.3, 119 R, 120

[56] References Cited

U.S. PATENT DOCUMENTS

| | | | |
|---|---|---|---|
| 1,701,876 | 2/1929 | Fleming | 73/47 |
| 2,573,646 | 10/1951 | Koestering | 73/47 |
| 3,563,084 | 2/1971 | Shaffer | 73/47 |
| 4,370,884 | 2/1983 | Wöss et al. | 73/117.3 |
| 4,393,693 | 7/1983 | Naito | 73/116 |
| 4,428,228 | 1/1984 | Banzhaf et al. | 73/47 |
| 4,483,185 | 11/1984 | Kunzfeld | 73/117.2 |
| 4,633,707 | 1/1987 | Haddox | 73/115 |
| 5,255,560 | 10/1993 | Klenk et al. | |
| 5,261,369 | 11/1993 | Vernier | 73/115 |
| 5,351,526 | 10/1994 | Krohm et al. | 73/49.7 |
| 5,372,036 | 12/1994 | Kainz | 73/117.3 |
| 5,417,109 | 5/1995 | Scourtes | 73/47 |

FOREIGN PATENT DOCUMENTS

| | | | |
|---|---|---|---|
| 54-58108 | 10/1979 | Japan | 73/49.7 |
| 121336A | 1/1989 | Japan | 73/47 |

*Primary Examiner*—Richard Chilcot
*Assistant Examiner*—Eric S. McCall
*Attorney, Agent, or Firm*—Walter Ottesen

[57] ABSTRACT

The invention is directed to a method of checking the tightness of exhaust valves of an internal combustion engine with the aid of an apparatus. The apparatus includes a device for forming a value LU for the uneven running of the engine and a device for metering air into a region disposed downstream of the exhaust valves as viewed in the flow direction of the exhaust gas. In the method, a first value LU1 is formed for the uneven running without air being supplied in the above-mentioned region and a second value LU2 is formed for uneven running with air being supplied in the above-mentioned region. An exhaust valve is deemed to leak when the first and the second values for the uneven running differ by more than a predetermined amount.

5 Claims, 3 Drawing Sheets

METHOD OF DETECTING A LEAKY EXHAUST VALVE

FIELD OF THE INVENTION

The invention relates to a method for detecting a leaky exhaust valve which controls the discharge of combusted gases from the work volume of an internal combustion engine.

BACKGROUND OF THE INVENTION

Discharge valves can become leaky because of too little valve play or because of damaged sealing surfaces. As a consequence, the following occurs: exhaust gas from previous work strokes enters the cylinder when the fresh gas charge is inducted for the next work stroke, the quality of the next combustion is reduced and thereby negatively affects the exhaust gas composition and the even running of the internal combustion engine. The catalytic converter of the engine can be overheated because of secondary reactions when the quality of the combustion is greatly reduced.

Methods for detecting combustion misfires are known, for example, from U.S. Pat. No. 5,255,560. Combustion misfires or uneven running fluctuations can also occur because of defects of the ignition equipment or a defect in the formation of the mixture can be caused, for example, by defective injection valves. For this reason, leaky exhaust valves cannot be clearly identified as the cause of a fault with the known methods. Up until now, leaky exhaust valves can be identified only with relatively great difficulty and service station means, for example, by disassembling the cylinder head.

SUMMARY OF THE INVENTION

In view of the foregoing, it is an object of the invention to provide a method which permits leaky exhaust valves to be detected in a manner simpler than was previously possible. The method proceed from a modern internal combustion engine having a system which includes a secondary air pump.

The method of the invention is for checking the tightness of exhaust valves of an internal combustion engine and includes the steps of: providing means for forming a measure for uneven running of the engine and means for metering air to a region of the exhaust system downstream of the exhaust valves; forming a first quantity for uneven running without metering air into the region; forming a second quantity for uneven running while metering air to the region; and, determining one of the exhaust valves to leak when the first quantity and said second quantity differ by more than a predetermined amount.

It is especially advantageous to apply the invention to a motor vehicle which is additionally equipped with an arrangement for detecting combustion misfires. In a motor vehicle of this kind, the method of the invention enables a leaky exhaust valve to be determined during operation of the engine. If the leakage can be attributed to an incorrect adjustment of valve play, the driver can have this fault timely corrected before the affected valve becomes permanently defective because of overheating.

As an alternative to the foregoing, it is also possible to carry out the method of the invention in motor vehicles, which are not equipped with misfire detection, by evaluating the rpm signal utilizing service station means.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
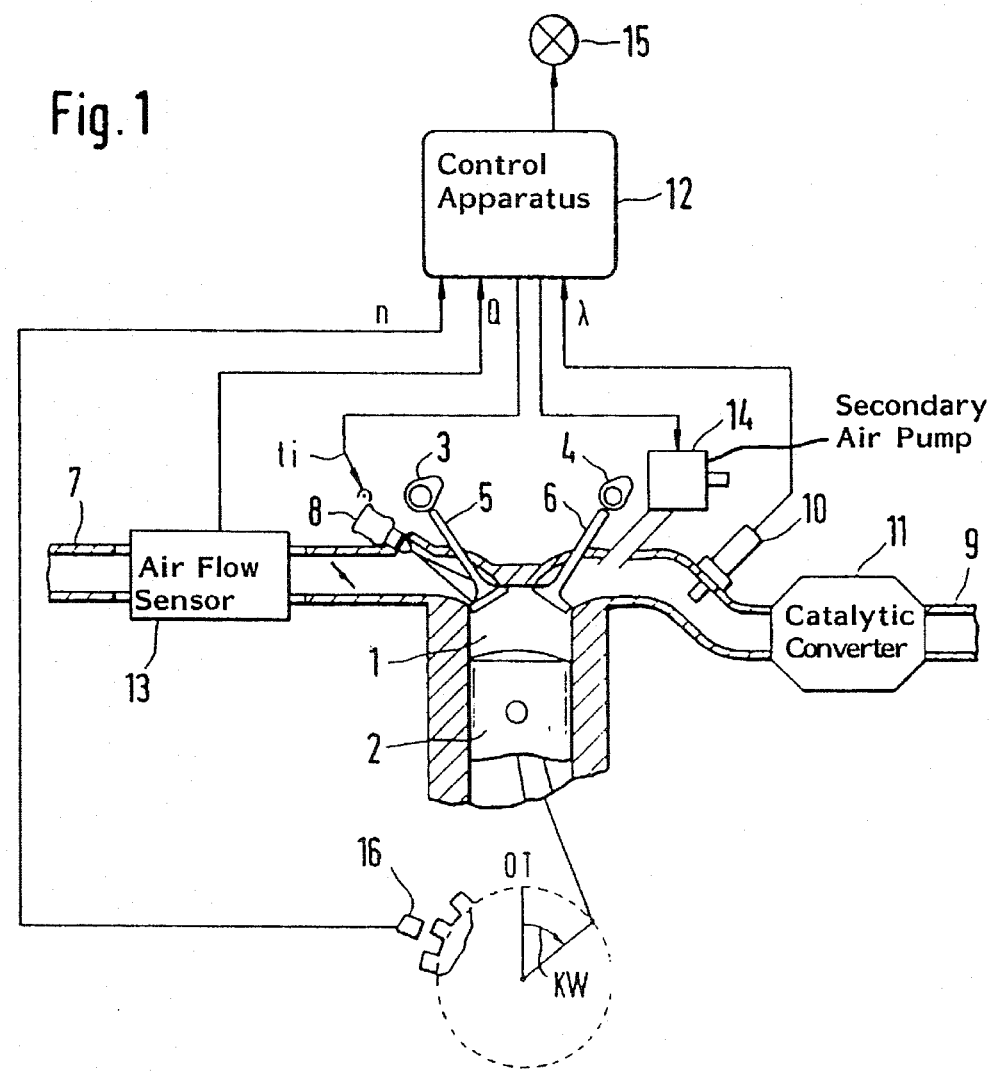
FIG. 1 shows the technical background of the invention in the form of an internal combustion engine and the components corresponding thereto.

Reference numeral 1 identifies the interior of a cylinder of an internal combustion engine which is movably sealed by a piston 2. The control of the change of the cylinder charge results from the coaction of the piston movement and the movement of the inlet valve 5 and discharge valve 6. The movements of valves 5 and 6 are controlled by cam shafts 3 and 4, respectively. When the inlet valve 5 is open, an unburnt mixture is inducted from the intake pipe 7. This unburnt mixture is formed from the inducted air mass Q and fuel metered by the injection valve 8. When the exhaust valve is open, the exhaust gases leave the cylinder through the exhaust-gas pipe 9 in the direction toward the exhaust-gas probe 10 and catalytic converter 11. The injected quantity ti is computed by a control apparatus 12 in dependence upon the following: the signal (n) of an rpm sensor 16, the signal Q of an air-flow sensor 13 and the signal $\lambda$ of the exhaust-gas probe 10. A secondary air pump 14 blows in air in a region behind the exhaust valve 6 for postoxidizing the engine exhaust gas after combustion in the cylinder. Reference numeral 15 identifies a means for displaying or storing a defect signal for the tightness of the exhaust valve.

Figure 2:
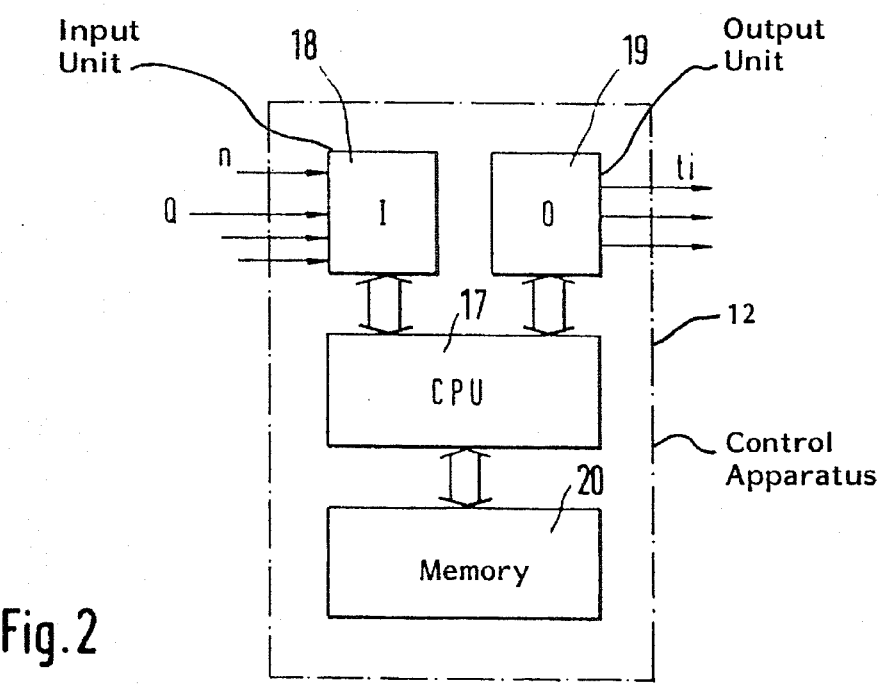
FIG. 2 is a block diagram showing basic function of a control apparatus shown in FIG. 1.

FIG. 2 shows the operation of the control apparatus 12 of FIG. 1. A central control unit 17 mediates between an input unit 18 and an output unit 19 utilizing data and programs which are stored in memory 20.

Figure 3:
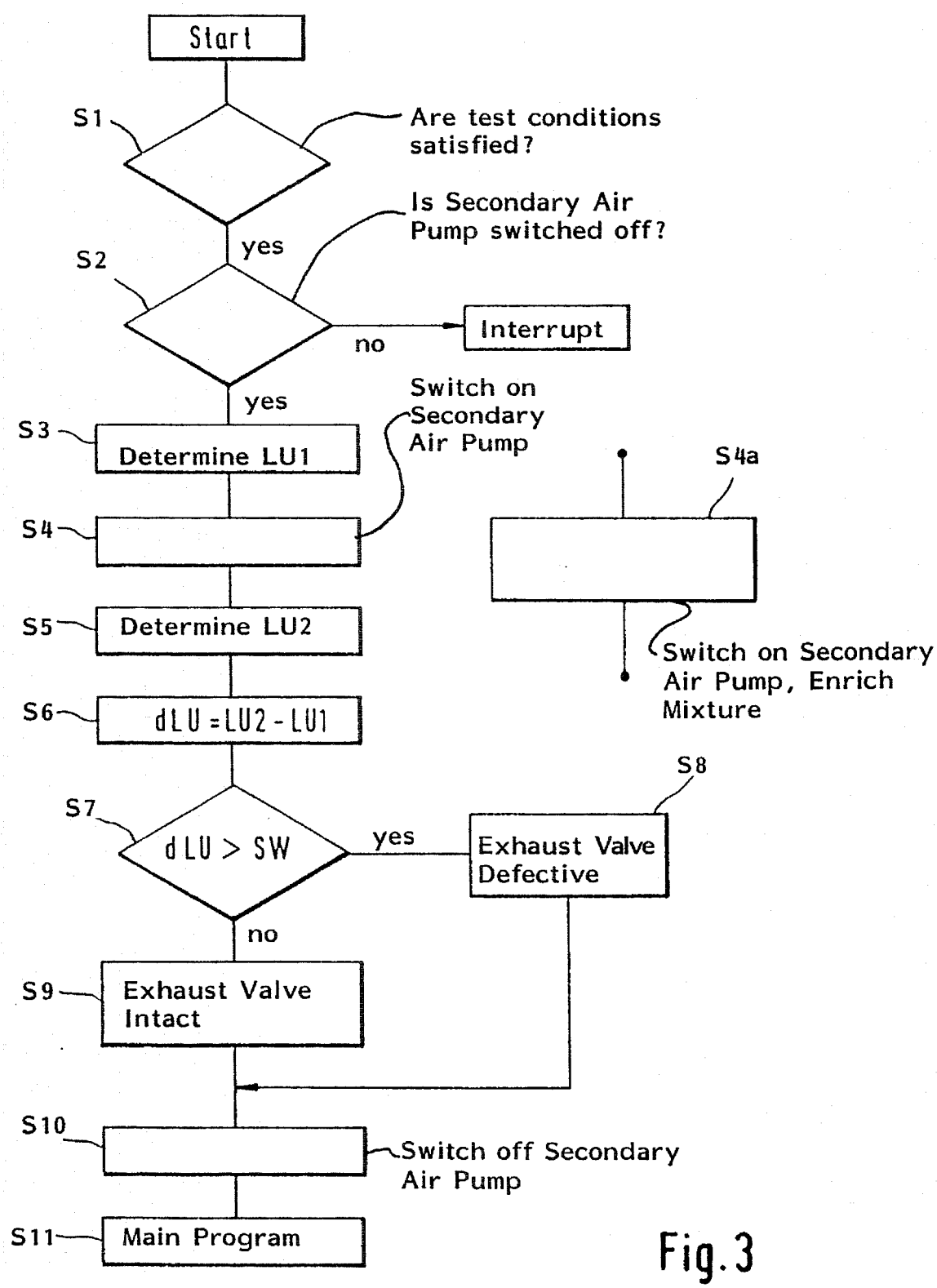
FIG. 3 illustrates an embodiment of the method of the invention in the context of a flowchart; and, FIG. 4 shows signal traces as they occur in the embodiment of the method of the invention.

This arrangement, known per se, is utilized in carrying out the method of the invention which is presented in FIG. 3 as a flowchart.

The sequence of steps of this embodiment can be called up during operation of the engine as a subprogram of a higher-ranking main program for controlling the operation of the internal combustion engine. After the start of the program, a check is made in step S1 as to whether specific conditions are satisfied which would make the further method sequence purposeful. Examples of such conditions are: elapse of a minimum operating duration since a previous execution of the method; existence of an engine temperature between a minimum temperature and a maximum temperature; existence of almost constant operating conditions over a minimum time span and the like.

If these conditions are satisfied and it is also ensured via step S2 that the secondary air pump is not activated, then, in step S3, a first uneven-running value LU1 is specified. Step S4 follows with the switching on of the secondary air pump or, as an alternative thereto, the secondary air pump is switched on in combination with a controlled mixture enrichment (step S4a). The mixture enrichment can, however, also be effected by the lambda control which reacts with an enrichment to the metering of secondary air.

An internal combustion engine having a leaky exhaust valve reacts to this step with a quieter running performance because no exhaust gas is inducted into the cylinder via the leak; instead, fresh air is inducted into the cylinder. This fresh air, especially in combination with the controlled mixture enrichment, approximates the desired mixture composition. The uneven-running value LU2 is detected in step S5 with the secondary air pump switched on. This uneven-running value LU2 therefore differs from the value LU1 detected without the operation of the secondary air pump in the case of a defective exhaust valve. The difference (dLU= LU2–LU1) is formed in step S6. The exhaust valve is deemed to be defective in step S7 if this difference dLU exceeds the threshold value SW which is determined empirically. In this case, the corresponding step S8 activates the means 15 which displays the determined defect. If in contrast, the threshold value SW is not exceeded, then the exhaust valve is deemed to be intact and this is symbolized by step S9. The switchoff of the secondary air pump follows in step S9 or S10 before the main program is again reached in step S11.

Figure 4A:
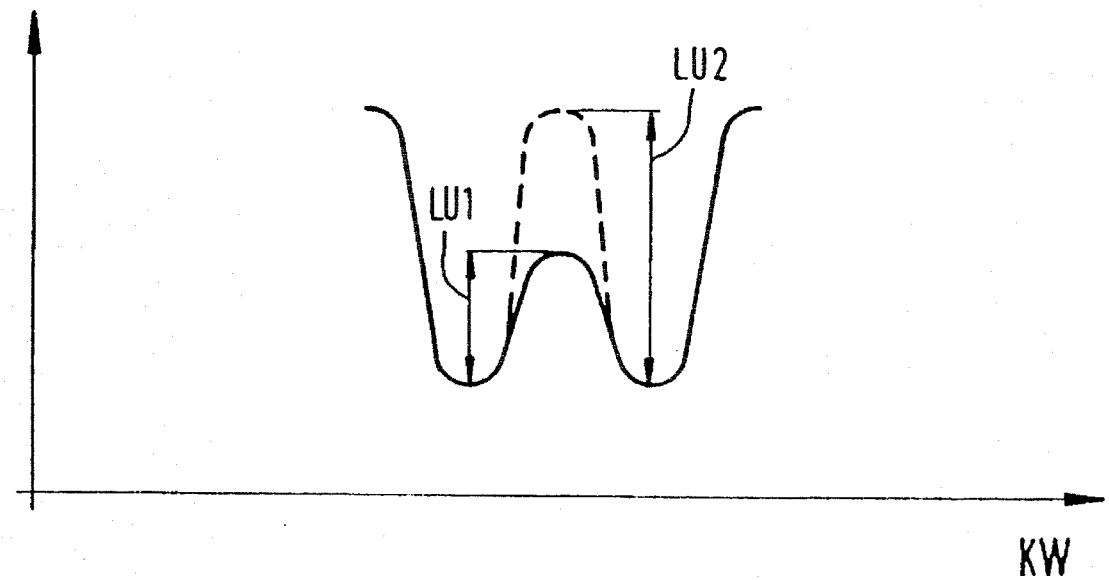
Figure 4B:
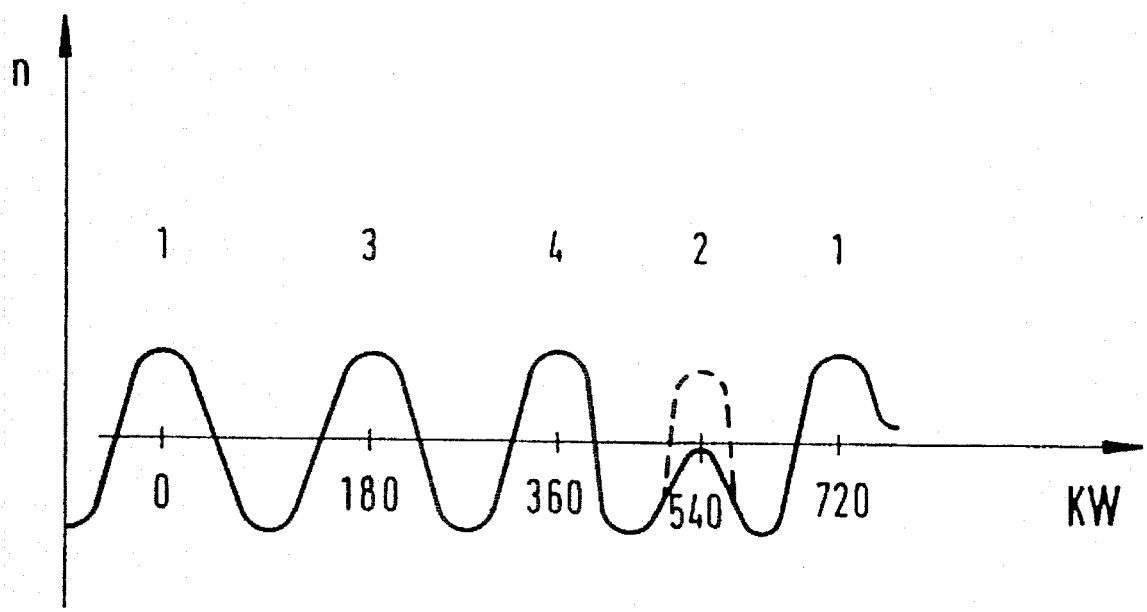

FIGS. 4a and 4b show an example for obtaining uneven-running values from the rpm signal of the internal combustion engine. If this rpm signal is plotted as a function of the rotational angle KW of the crankshaft, then the work cycles of the engine in combination with the oscillating piston movement are reflected in a periodic oscillation of the rpm signal. Each combustion leads to an increase and each compression leads to a drop of the rpm signal. Correspondingly, the rpm differences, which result as a consequence of the minima and maxima of the rpm signal, can be evaluated as an index for the even running.

The solid line curve in FIG. 4a shows a small difference LU1 as it can occur as a consequence of a poor combustion because of a defective exhaust valve. With the secondary air pump switched on, the quality of the combustion improves and the curve shows the trace shown in FIG. 4a by the broken line.

FIG. 4b shows the rpm signal (n) of a four-cylinder engine plotted as a function of the angular range KW of two crankshaft revolutions. The numbers above the maxima of the curve identify the cylinder whose workstroke has lead to the particular rpm maximum. Here, the case is shown wherein the exhaust valve of the second cylinder is defective; whereas, the exhaust valves of the other cylinders are intact. From this illustration it is clear how individual defective exhaust valves of a multi-cylinder internal combustion engine can be identified by an evaluation of the rpm signal in accordance with the method off the invention. The evaluation of the rpm signal is here correlated to the ignition sequence.

The term rpm signal includes all signals which can be taken from the internal combustion engine and which, in turn, are a measure for the rpm of the crankshaft, that is, those signals which reflect the rpm of the crankshaft. The uneven-running values can be obtained with embodiments other than that shown. Uneven-running values can, for example, be obtained in that, for each pregiven angular range of a crankshaft revolution, the particular required time spans are measured and these time spans are logically coupled to each other in a pregiven manner. Algorithms for such couplings are, for example, disclosed in U.S. Pat. No. 5,044,195 which also lists the most comprehensive state of the art for determining uneven running.

The detection and evaluation of uneven running can take place in the control apparatus of the engine as well as in service station test equipment which are so equipped that they can, for example, process a rpm signal in the manner shown in FIG. 3. It is here not essential whether the switching states of the secondary air pump are likewise determined by the service station apparatus or, if required, manually or by means of the engine control apparatus.

It is understood that the foregoing description is that of the preferred embodiments of the invention and that various changes and modifications may be made thereto without departing from the spirit and scope of the invention as defined in the appended claims.

What is claimed is:

1. A method of checking for leakage of exhaust valves of an internal combustion engine having an exhaust system, the method comprising the steps of:

provinding means for forming a measure for uneven running of the engine and means for metering air to a region of the exhaust system downstream of said exhaust valves;

running said engine under its own power;

forming a first quantity (LU1) for uneven running without metering air into said region downstream of said exhaust valves;

forming a second quantity (LU2) for uneven running while metering air to said region downstream of said exhaust valves; and, forming a difference (dLU) between said first quantity (LU1) and said second quantity (LU2);

determining one of said exhaust valves to leak when said difference exceeds a predetermined threshold value (SW).

2. The method of claim 1, wherein said engine is equipped with said means for forming said first and second quantities (LU1, LU2) and said means for metering air to said region; and, wherein said method is carried out in predetermined operating states of said engine.

3. The method of claim 1, wherein said internal combustion engine is mounted in a vehicle; and, wherein said method is carried out with equipment external of said vehicle for forming a quantity LU for the uneven running of said engine.

4. The method of claim 3, wherein said engine has a crankshaft rotating at a rotational speed measured in rpm; and, wherein said quantity LU for the uneven running of the engine is derived from a variable which reflects the rpm of the crankshaft of the engine.

5. The method of claim 4, wherein an air/fuel mixture is supplied to the engine during said operation thereof; and, wherein said means for metering air is a secondary air pump; and, wherein a controlled enrichment of the mixture takes place after said secondary air pump is switched on.

* * * * *